United States Patent
Carlson et al.

(10) Patent No.: US 12,428,523 B2
(45) Date of Patent: Sep. 30, 2025

(54) POLYURETHANES AND MOISTURE CURABLE COMPOSITIONS INCLUDING THE SAME

(71) Applicant: H.B. Fuller Company, St. Paul, MN (US)

(72) Inventors: Brian W. Carlson, Woodbury, MN (US); Justin Kaffenberger, Circle Pines, MN (US); Alan R. Nahkala, Stillwater, MN (US)

(73) Assignee: H.B. Fuller Company, St. Paul, MN (US)

( * ) Notice: Subject to any disclaimer, the term of this patent is extended or adjusted under 35 U.S.C. 154(b) by 715 days.

(21) Appl. No.: 17/662,214

(22) Filed: May 5, 2022

(65) Prior Publication Data

US 2022/0356352 A1 Nov. 10, 2022

Related U.S. Application Data

(60) Provisional application No. 63/201,575, filed on May 5, 2021.

(51) Int. Cl.
| | | |
|---|---|---|
| *C08G 18/10* | (2006.01) | |
| *C08G 18/36* | (2006.01) | |
| *C08G 18/42* | (2006.01) | |
| *C08G 18/76* | (2006.01) | |
| *C08G 63/12* | (2006.01) | |
| *C08G 63/20* | (2006.01) | |
| *C08G 63/52* | (2006.01) | |
| *C08L 75/14* | (2006.01) | |
| *C09J 7/38* | (2018.01) | |
| *C09J 175/14* | (2006.01) | |

(52) U.S. Cl.
CPC .............. *C08G 63/52* (2013.01); *C08G 18/36* (2013.01); *C08G 18/7692* (2013.01); *C08G 63/12* (2013.01); *C08G 63/20* (2013.01); *C08L 75/14* (2013.01); *C09J 7/38* (2018.01); *C09J 175/14* (2013.01); *C09J 2475/00* (2013.01)

(58) Field of Classification Search
CPC ........ C08G 18/10; C08G 18/36; C08G 63/12; C08G 63/20; C09J 7/38; C09J 2475/00
See application file for complete search history.

(56) References Cited

U.S. PATENT DOCUMENTS

| | | |
|---|---|---|
| 3,714,090 A | 1/1973 | Lasher |
| 3,963,699 A | 6/1976 | Rizzi et al. |
| 4,469,635 A | 9/1984 | Peterson |
| 4,624,869 A | 11/1986 | De Graaf |
| 4,740,567 A | 4/1988 | Schmidt |
| 4,798,859 A | 6/1989 | Hohlein et al. |
| 5,349,041 A | 9/1994 | Blum et al. |
| 5,387,642 A | 2/1995 | Blum et al. |
| 5,480,667 A | 1/1996 | Corrigan et al. |
| 5,490,995 A | 2/1996 | Corrigan |
| 5,527,866 A | 6/1996 | Corrigan et al. |
| 5,538,670 A | 7/1996 | Sharma |
| 5,624,676 A | 4/1997 | Mackey et al. |
| 5,958,594 A | 9/1999 | Hisanaga et al. |
| 5,959,067 A | 9/1999 | Bakker et al. |
| 7,098,291 B2 | 8/2006 | Brinkman |
| 7,374,779 B2 | 5/2008 | Chen et al. |
| 8,070,833 B2 | 12/2011 | Murphy |
| 8,157,873 B2 | 4/2012 | Murphy et al. |
| 8,333,905 B1 | 12/2012 | Kurth et al. |
| 9,334,347 B2 | 5/2016 | DiBiase et al. |
| 2006/0182957 A1 | 8/2006 | Simmons |
| 2013/0131222 A1 | 5/2013 | Gross |
| 2014/0275310 A1 | 9/2014 | Adkins et al. |
| 2015/0218415 A1 | 8/2015 | Nixon et al. |
| 2017/0002134 A1 | 1/2017 | Smits et al. |
| 2017/0190829 A1* | 7/2017 | Tian .................. C08G 18/3206 |
| 2017/0008997 A1 | 12/2017 | Honcoop et al. |
| 2018/0305597 A1* | 10/2018 | Yao .................... C08G 18/4841 |
| 2020/0055982 A1 | 2/2020 | Wu et al. |
| 2020/0148817 A1 | 5/2020 | Terwillegar et al. |

FOREIGN PATENT DOCUMENTS

| | | | |
|---|---|---|---|
| CA | 888282 | 12/1971 | |
| CN | 103772675 | 5/2014 | |
| EP | 0940417 A1 * | 9/1999 | ............. C08G 18/36 |
| GB | 2278350 | 11/1994 | |
| KR | 20110073975 | 6/2011 | |
| WO | WO 2018-005538 | 1/2018 | |
| WO | WO 2003-029182 | 4/2020 | |

* cited by examiner

*Primary Examiner* — Arrie L Reuther
*Assistant Examiner* — Devin Mitchell Darling
(74) *Attorney, Agent, or Firm* — Allsion Johnson; Kristen Stone

(57) ABSTRACT

Polyurethanes and hot melt moisture curable adhesive compositions that include the same are disclosed. The polyurethane includes the reaction product of diisocyanate and a semi-crystalline polyester polyol having an acid number of less than 4 and including the reaction product of a saturated fatty component having a hydroxyl number less than 2, the saturated fatty component being selected from the group consisting of saturated fatty acid, saturated fatty acid ester, saturated oil, and combinations thereof, a polyhydric alcohol that includes at least three hydroxyl groups, and a dibasic acid.

24 Claims, No Drawings

POLYURETHANES AND MOISTURE CURABLE COMPOSITIONS INCLUDING THE SAME

CROSS REFERENCE TO RELATED APPLICATIONS

This application claims the benefit of U.S. Provisional Application No. 63/201,575, filed May 5, 2021, and incorporated herein.

BACKGROUND

The invention is directed to preparing polyurethanes and hot melt moisture curable adhesive compositions from semi-crystalline polyester polyols.

Polyester polyols are often made from aliphatic polyols and dicarboxylic acids. Polyester polyols can be amorphous or semi-crystalline. Polyester polyols are often used to form urethane polymers and prepolymers. Semi-crystalline polyester polyols can impact various properties of polymers and prepolymers made therewith including, e.g., the rate of crystallization of the prepolymer, the temperature at which the prepolymer flows, and the temperature at which an adhesive formulated therewith solidifies and loses tack.

Natural oils have been used to make amorphous polyester polyols that are liquid at room temperature. Most natural oils include unsaturation and, in some cases (e.g., castor oil), include hydroxyl groups. Natural oils are triglycerides with fatty acid side chains that often have from 8 to 22 carbon atoms. Polyester polyols have been made from unsaturated natural oils by first adding hydroxyl functionality through a number of processes including, e.g., epoxidation and ring opening, hydroxylation, transesterification, and oxidation. In some cases, after the oils have been hydroxylated, the resulting product has then been further reacted with polyols, diacids and combinations thereof to form polyester polyols.

Many natural oils contain unsaturation in the fatty acid chains. The degree of unsaturation can be reflected in the Iodine Value of an oil. Oils can be hydrogenated to remove unsaturation in the fatty acid chains of the oil. Soybean oil, for example, typically has an Iodine Value from 125 to 135, whereas hydrogenated soybean oil can have an Iodine Value of less than 5.

There is a need for polyurethanes (e.g., polyurethane prepolymers and thermoplastic polyurethanes) that are derived from semi-crystalline polyester polyols derived from biobased starting materials, as well as moisture curable adhesive compositions that include polyurethanes.

SUMMARY

In one aspect, the invention features a polyurethane prepolymer that includes the reaction product of diisocyanate, and a semi-crystalline polyester polyol having an acid number of less than 4, the semi-crystalline polyester polyol comprising the reaction product of a saturated fatty component having a hydroxyl number less than 2, the saturated fatty component being selected from the group consisting of saturated fatty acid, saturated fatty acid ester, saturated oil, and combinations thereof, a polyhydric alcohol comprising at least three hydroxyl groups, and a dibasic acid. In one embodiment, the polyurethane prepolymer is isocyanate terminated. In other embodiments, the polyurethane prepolymer includes the reaction product of the diisocyanate, the semi-crystalline polyester polyol, and a second polyol. In some embodiments, the second polyol is selected from the group consisting of polyether polyol, polyester polyol, polycarbonate polyol, polybutadiene polyol, polyacetal, and combinations thereof. In other embodiments, the second polyol includes polybutadiene polyol.

In other embodiments, the polyurethane prepolymer includes the reaction product of the diisocyanate, the semi-crystalline polyester polyol, a second polyol, and a multifunctional crosslinking agent comprising at least three reactive groups.

In another embodiment, the semi-crystalline polyester polyol has an average hydroxyl functionality of from to 1.5 to 2.5. In other embodiments, the semi-crystalline polyester polyol exhibits a peak melt temperature of at least 30° C. In one embodiment, the semi-crystalline polyester polyol exhibits a peak crystallization temperature of at least 30° C. In some embodiments, the semi-crystalline polyester polyol has a hydroxyl number of from 10 to 110. In other embodiments, the semi-crystalline polyester polyol has an acid number of no greater than 2.

In some embodiments, the polyhydric alcohol is a tetraol.

In one embodiment, the fatty component has an Iodine Value no greater than 50.

In other embodiments, the semi-crystalline polyester polyol is further derived from monomeric diol.

In some embodiments, the semi-crystalline polyester polyol has a hydroxyl number of from 10 to 110 and an acid number no greater than 2.

In one embodiment, the saturated fatty component is a saturated fatty acid ester, a saturated oil, or a combination thereof, and the reaction product includes a transesterification product resulting from the transesterification of the saturated fatty component with the polyhydric alcohol. In another embodiment, the semi-crystalline polyester polyol has a hydroxyl number of from 10 to 110, the saturated fatty component is a saturated fatty acid ester, a saturated oil, or a combination thereof, and the reaction product includes a transesterification product resulting from the transesterification of the saturated fatty component with the polyhydric alcohol.

In another aspect, the invention features a hot melt moisture curable adhesive composition that includes the polyurethane prepolymer described above and herein. In one embodiment, the hot melt moisture curable adhesive composition further includes a thermoplastic polymer.

In other aspects, the invention features a hydroxy-terminated polyurethane that includes the reaction product of diisocyanate and a semi-crystalline polyester polyol having an acid number of less than 4, the semi-crystalline polyester polyol comprising the reaction product of a saturated fatty component having a hydroxyl number less than 2, the saturated fatty component being selected from the group consisting of saturated fatty acid, saturated fatty acid ester, saturated oil, and combinations thereof, a polyhydric alcohol comprising at least three hydroxyl groups, and a dibasic acid, the ratio of isocyanate groups to hydroxyl groups being less than 1.

In one aspect, the invention features an article that includes a substrate, and a cured hot melt moisture curable adhesive composition disclosed herein disposed on the substrate.

In another aspect, the invention features an article that includes a substrate, and a thermoplastic polyurethane that includes a hydroxy-terminated polyurethane describe above or herein disposed on the substrate.

Other features and advantages will be apparent from the following description of the preferred embodiments and from the claims.

Glossary

In reference to the invention, these terms have the meanings set forth below:

The term "reaction product of" does not exclude additional unrecited reactants.

The term "derived from" does not exclude additional unrecited reactants.

DETAILED DESCRIPTION

Polyurethane

Polyurethanes, including isocyanate-terminated polyurethane prepolymers, hydroxy-terminated polyurethanes and thermoplastic polyurethanes, are prepared from isocyanate, a semi-crystalline polyester polyol that includes the reaction product of a saturated fatty component, a polyhydric alcohol, and a dibasic acid (hereinafter, the semi-crystalline polyester polyol), and optionally additional reactants including, e.g., at least one second polyol.

Isocyanate-terminated polyurethane prepolymers include the reaction product of diisocyanate, a semi-crystalline polyester polyol that includes the reaction product of a saturated fatty component, a polyhydric alcohol, and a dibasic acid (hereinafter, the semi-crystalline polyester polyol), and optionally additional reactants including, e.g., at least one second polyol. The stoichiometric isocyanate (NCO) to hydroxyl (OH) (NCO:OH) ratio of the reactants used to prepare the isocyanate-terminated polyurethane prepolymer is greater than 1.

Hydroxy-terminated polyurethanes also include the reaction product of diisocyanate, the semi-crystalline polyester polyol, and optionally additional reactants including, e.g., at least one second polyol, and the stoichiometric NCO:OH ratio of the reactants used to prepare the hydroxy-terminated polyurethane is less than 1. The hydroxy-terminated polyurethane optionally is thermoplastic.

Diisocyanate

The diisocyanate used to form the isocyanate-terminated polyurethane prepolymers, the hydroxy-terminated polyurethanes and the thermoplastic polyurethanes can be liquid or solid at room temperature. Useful diisocyanates include, e.g., monomeric diisocyanates, oligomeric diisocyanates, aromatic diisocyanates, aliphatic diisocyanates, cycloaliphatic diisocyanates, and combinations thereof. Useful aromatic diisocyanates include, e.g., diphenyl methylene diisocyanate (MDI), (e.g., diphenylmethane-2,4'-diisocyanate (i.e., 2,4'-MDI), diphenylmethane-2,2'-diisocyanate (i.e., 2,2'-MDI), diphenylmethane-4,4'-diisocyanate (i.e., 4,4'-MDI), and combinations thereof), tetramethylxylene diisocyanate, naphthalene diisocyanate (e.g., naphthalene-1,5-diisocyanate, naphthalene-1,4-diisocyanate, and combinations thereof), toluene diisocyanate (TDI) (e.g., 2,4-TDI, 2,6-TDI, and combinations thereof), and combinations thereof. Useful cycloaliphatic diisocyanates include, e.g., 1-isocyanatomethyl-3-isocyanato-1,5,5-trimethyl-cyclohexane (i.e., isophorone diisocyanate (i.e., IPDI), 1-methyl-2,4-diisocyanato-cyclohexane, 1,4-diisocyanato-2,2,6-trimethylcyclohexane (i.e., TMCDI), hydrogenation products of the aforementioned aromatic diisocyanates (e.g., hydrogenated 2,4'-MDI, hydrogenated 2,T-MDI, hydrogenated 4,4'-MDI and combinations thereof), and combinations thereof. Useful aliphatic diisocyanates include, e.g., hexamethylene diisocyanate (e.g., 1,6-diisocyanato-2,2,4-trimethylhexane, 1,6-diisocyanato-2,4,4-trimethylhexane diisocyanate, and combinations thereof), lysine diisocyanate, dodecane diisocyanate, dimer diisocyanate, and combinations thereof.

Useful diisocyanate monomers are commercially available under a variety of trade designations including, e.g., under the DESMODUR and MODUR series of trade designations from COVESTRO LLC (Pittsburgh, Pennsylvania) including, e.g., MODUR M 4,4'-MDI and DESMODUR 2460 M MDI that includes 2,4'-MDI and 4,4'-MDI, LUPRANATE M 4,4'-MDI from BASF Corp. (Wyandotte, Michigan), RUBINATE 44 from Huntsman Corp. (Auburn Hills, Michigan), and ISONATE 125 M from The Dow Chemical Company (Midland, Michigan).

Semi-Crystalline First Polyester Polyol

The semi-crystalline polyester polyol includes the reaction product of a saturated fatty component, a polyhydric alcohol, and a dibasic acid. The semi-crystalline polyester polyol is solid at room temperature, preferably exhibits a heat of fusion of at least 25 Joules per gram (J/g), at least 50 J/g, or even at least 75 J/g, and preferably exhibits heat of crystallization of at least 25 J/g, at least 50 J/g, or even at least 75 J/g. The semi-crystalline polyester polyol also exhibits a peak melt temperature of at least 30° C., at least 35° C., or even at least 40° C., and a peak crystallization temperature of greater than 25° C., at least 30° C., or even at least 35° C. The semi-crystalline polyester polyol has a hydroxyl number (i.e., OH number) of from 10 to 150, from 10 to 110, or even from 20 to 45, and an acid number of less than 4, no greater than 3, no greater than 2, or even no greater than 1. The semi-crystalline polyester polyol preferably has an average hydroxyl functionality of from 1.5 to 2.5, from 1.75 to 2.25, or even 2.0, as calculated based on the starting materials (i.e., the amounts and the composition of the reactants).

Saturated Fatty Component

The saturated fatty component has an OH number less than 2, less than 1, or even is free of hydroxyl groups such that it has no measurable hydroxyl number. To the extent that the saturated fatty component has a measurable OH number, the hydroxyl groups which form the basis for the OH number result from impurities from the glyceride from which the fatty component was derived (where applicable), e.g., impurities in the form of free glycerol or mono- or di-glycerides. The saturated fatty component preferably has an Iodine Value of no greater than 50, no greater than 40, no greater than 30, no greater than 20, or even no greater than 5. The saturated fatty component is solid at room temperature and preferably has a peak melting temperature of greater than 30° C., at least 35° C., or even at least 40° C. The saturated fatty component can be naturally occurring or can be the result of a variety of processes including, e.g., a hydrogenation process to remove unsaturation.

Useful saturated fatty components include, e.g., saturated oils, saturated fatty acids, saturated fatty acid esters, and combinations thereof. Useful saturated oils include, e.g., saturated mono-, di- and tri-glycerides, natural oils having an Iodine Value no greater than 50, hydrogenated oils (e.g., hydrogenated oils having an Iodine Value less than 50), and combinations thereof. Useful oils that have an Iodine Value less than 50 or that can be hydrogenated to an Iodine Value less than 50 include, e.g., soybean oil, cottonseed oil, palm oil, palm kernel oil, coconut oil, rape seed oil, corn oil, olive oil, safflower oil, sesame oil, nut oil (e.g., peanut, almond, and walnut oils, and combinations thereof), avocado oil, tall oils, tallow, lesquerella oil, tung oil, whale oil, tea seed oil, fish oils, and combinations thereof, and processed natural oils (e.g., palm stearin, palm double stearin, palm kernel stearin, and combinations thereof), and combinations thereof.

Suitable hydrogenated oils are commercially available under a variety of trade designations including, e.g., NATUREWAX S-155 hydrogenated soybean oil having a mettler drop point of 158° F. (70° C.) and a maximum Iodine Value of 4 from Cargill Inc. (Charlotte, North Carolina), the value as reported by the manufacturer, and under the MARCUS series of trade designations from Marcus Oil and Chemical (Houston, Texas) including, e.g., MARCUS NAT WAX 155 hydrogenated soybean oil having a maximum Iodine Value of less than 5, a maximum acid value of 1, and a melt point of from 68° C. to 71° C. (i.e., 155° F. to 160° F.) and MARCUS NAT WAX 180 hydrogenated soybean oil having a maximum Iodine Value of 4, a maximum acid value of 3, and a melt point of from 82° C. to 84° C. (i.e., 180° F. to 184° F.), all values as reported by the manufacturer.

Useful saturated fatty acids and saturated fatty acid esters have at least one carbon chain that includes at least eight carbon atoms, at least 12 carbon atoms, from 12 carbon atoms to 22 carbon atoms, or even from 14 carbon atoms to 18 carbon atoms, and combinations thereof. Useful saturated fatty acids include, e.g., caprylic acid, capric acid, lauric acid, myristic acid, palmitic acid, stearic acid, arachidic acid, behenic acid, and combinations thereof. Useful saturated fatty acid esters include the saturated fatty acid esters of the aforementioned fatty acids including, e.g., stearate, caprylate, caprate, laurate, myristate, palmitate, arachidate, behenate, and combinations thereof.

Polyhydric Alcohol

The polyhydric alcohol includes at least three hydroxyl groups. Useful polyhydric alcohols include at least three hydroxyl groups, at least four hydroxyl groups, or even greater than four hydroxyl groups, and have from three to 20 carbon atoms. The polyhydric alcohol preferably has a molecular weight of less than 500 g/mole, or even less than 400 g/mole. Suitable polyhydric alcohols include, e.g., triols (e.g., trimethylolpropane, trimethylolethane, glycerol, 1,2,4-butane triol, 1,2,6-hexane triol, and cyclohexanetriol (e.g., 1,3,5-cyclohexanetriol)), tetraols (e.g., erythritol, pentaerythritol, bis(trimethylolpropane), and diglycerol), higher order polyhydric alcohols (e.g., dipentaerythritol, tripentaerythritol, sorbitol, and mannitol), and combinations thereof.

Dibasic Acid

The dibasic acid can be a dibasic acid, dibasic acid anhydride, dibasic acid ester, or a combination thereof, useful examples of which include, e.g., dicarboxylic acids, dicarboxylic acid anhydrides, diesters of dicarboxylic acids, and combinations thereof. Useful dibasic acids include, e.g., linear, branched, cyclic aliphatic, and aromatic dibasic acids, and combinations thereof. Suitable linear dibasic acids preferably include an even number of carbon atoms in the carbon chain and preferably from 2 to 12 carbon atoms. Useful dibasic acids include, e.g., succinic acid, adipic acid, suberic acid, sebacic acid, terephthalic acid, phthalic acid, phthalic anhydride, and combinations thereof.

Reaction Process

The semi-crystalline polyester polyol can be prepared according to a variety of processes including, e.g., a first reaction (e.g., a transesterification reaction, an esterification reaction, or a combination thereof) in which the polyhydric alcohol is reacted with the saturated fatty ester component to form a first reaction product, and a second reaction (e.g., an esterification reaction, a transesterification reaction, a polycondensation reaction, or a combination thereof) in which a dibasic acid is reacted with the first reaction product to form the semi-crystalline polyester polyol. The second reaction can start simultaneously with the first reaction, can start before the first reaction starts, can occur after the first reaction is complete, or while the first reaction is proceeding, and combinations thereof.

Catalysts

The reactions used to form the semi-crystalline polyester polyol can be conducted in the presence of a catalyst. Suitable transesterification and esterification catalysts include, e.g., catalysts that include tin, titanium, zirconium, hafnium, zinc, manganese, magnesium, calcium, strontium, and combinations thereof, alkali metal salts, and combinations thereof. Particularly useful catalysts for transesterification include alkali metal salt catalysts including, e.g., lithium hydroxide, potassium hydroxide, sodium methoxide, and combinations thereof. Particularly useful catalysts for esterification include, e.g., the alkali metal salt catalysts set forth above, tin catalysts (e.g., dibutyltin oxide, butylstannoic acid, monobutyltin tris(2-ethylhexanoate), dibutyltin acetate, monobutyltin dihydroxychloride, and combinations thereof), titanate catalysts (e.g., tetra-n-butyl titanate, tetra-2-ethylhexyl titanate, tetraisopropyl titanate, and combinations thereof), zirconium catalysts (e.g., zirconyl diacetate, zirconium tris(butoxy)stearate, zirconium tetraacetate, zirconium acetate hydroxide, ammonium zirconium oxalate, potassium zirconium oxalate, polyhydroxyzirconium stearate, zirconium tetra-n-propoxide, zirconium tetraisopropoxide, zirconium tetra-n-butoxide, zirconium tetra-t-butoxide, and combinations thereof), and combinations thereof.

The first and second reactions used to form the semi-crystalline polyester polyol preferably proceed in an inert environment, e.g., under an inert gas such as nitrogen. The temperature of the reaction mixture during the first and second reactions can be adjusted as needed according to a variety of factors including, e.g., the reactants, the catalysts (where present), the equipment, the properties of the polyester polyol to be produced, the reactions, and combinations thereof. Useful reaction temperatures for the first and second reactions include, e.g., from 150° C. to 270° C., or even from 180° C. to 240° C.

The semi-crystalline polyester polyol optionally is derived from a variety of additional components including, e.g., cyclic esters (e.g., caprolactone), cyclic carbonates (e.g., ethylene carbonate, propylene carbonate, and combinations thereof), monomeric diols, trifunctional acids, and combinations thereof. Useful monomeric diols include, e.g., ethylene glycol, diethylene glycol, propylene glycol, dipropylene glycol, 1,4-butane diol, 1,5-pentane diol, neopentyl glycol, 1,6-hexane diol, 1,8-octane diol, 1,10-decane diol, 1,12-dodecane diol, 2-ethyl hexane diol, and combinations thereof.

Useful trifunctional acids include, e.g., citric acid, isocitric acid, aconitic acid, propane-1,2,3-tricarboxylic acid, agaric acid, trimesic acid, and combinations thereof.

Optional Additional Reactants

The isocyanate-terminated polyurethane prepolymers, the hydroxy-terminated polyurethanes, and the thermoplastic polyurethanes optionally are derived from additional reactants including, e.g., polyols (i.e., second polyols), other hydroxy functional reactants including, e.g., hydroxy functional acrylates, hydroxy functional tackifying agents, hydroxy functional plasticizers, and combinations thereof. Useful classes of additional polyols include, e.g., polyether polyols, additional polyester polyols, polycarbonate polyols, polybutadiene polyols (e.g., hydrogenated polybutadiene polyols, nonhydrogenated polybutadiene polyols, and combinations thereof), polyacetals, and combinations thereof.

Polyether Polyol

Useful polyether polyols suitable as the second polyol include linear and branched polyether homopolymers and copolymers. The polyether polyol can be derived from oxide monomer (e.g., ethylene oxide, propylene oxide, 1,2-butylene oxide, 1,4-butylene oxide, tetrahydrofuran, and combinations thereof). Particularly useful polyether polyols include, e.g., polyethylene glycol, polypropylene glycol, the reaction product of propylene oxide or butylene oxide capped or copolymerized with ethylene oxide (e.g., ethylene oxide capped polypropylene glycol), polytetramethylene ether glycol, and combinations thereof.

Suitable commercially available polyether polyols are available under a variety of trade designations including, e.g., under the VORANOL series of trade designations from Dow Chemical (Midland, Michigan) including VORANOL 220-056 polypropylene glycol and VORANOL 2000 L polypropylene glycol, the ACCLAIM and ARCOL series of trade designations from Covestro LLC (Pittsburgh, Pa.), and the POLY-G series of trade designations from Monument Chemicals LLC (Indianapolis, Indiana).

Polyester Polyol

Useful optional additional polyester polyols include, e.g., semi-crystalline polyester polyols, amorphous polyester polyols, liquid polyester polyols, and combinations thereof. Suitable polyester polyols can be derived from dicarboxylic acids (e.g., aliphatic, cycloaliphatic, araliphatic, aromatic, and heterocyclic dicarboxylic acids), derivatives of dicarboxylic acids (e.g., anhydrides, esters and acid chlorides), tri-carboxylic acids and anhydrides (e.g., trimellitic acid, trimellitic anhydride, and combinations thereof), aliphatic diols, cycloaliphatic diols, linear diols, branched diols, triols, caprolactones, and combinations thereof. Examples of useful dicarboxylic acids and anhydrides from which the polyester polyol can be derived include adipic acid, succinic acid, suberic acid, azelaic acid, sebacic acid, dodecanedioic diacid, cyclohexane diacid, glutaric acid, phthalic acid, isophthalic acid, terephthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimeric fatty acids, trimeric fatty acid, and combinations thereof. Examples of useful aliphatic diols from which the polyester polyol can be derived include ethylene glycol, 1,2-propanediol, 1,3-propanediol, 1,4-butanediol, 1,3-butanediol, 2,3-butanediol, 1,4-butenediol, 1,4-butynediol, 1,5-pentanediol, neopentyl glycol, 1,6-hexanediol, hexenediols, hexynediols, 1,7-heptanediol, heptenediols, heptynediols, 1,8-octanediol, octenediols, octynediols, cyclohexane dimethanol, and combinations thereof. Examples of triols include glycerol, trimethylolpropane, pentaerythritol, sorbitol, and glucose, and combinations thereof.

Useful polycaprolactone polyols include caprolactone diols, triols, tetraols, and combinations thereof. Polycaprolactone triols can be derived from an alcohol having at least three hydroxyl groups and caprolactone. Useful alcohols that include at least three hydroxyl groups include, e.g., glycerol, triglycerol, polyglycerols, trimethylolmethane, trimethylolethane, trimethylolpropane, 1,2,4-butanetriol, pentaerythritol, diglycerol, bis(trimethylolpropane), phloroglucinol, trihydroxytoluene, trihydroxydimethylbenzene, phloroglucides, hexahydroxybenzene, 1,3,5-benzenetrimethanol, 1,1,1-tri s(4'-hydroxyphenyl)methane, 1,1,1-tris (4'-hydroxyphenyl)ethane, sugars (e.g., glucose), and combinations thereof. Polycaprolactone polyols are commercially available under a variety of trade designations including, e.g., under the CAPA series of trade designations from Ingevity Corporation (North Charleston, South Carolina).

Polycarbonate Polyol

Useful optional polycarbonate polyols include, e.g., aliphatic polycarbonate polyols, cyclic aliphatic polycarbonate polyols, aromatic polycarbonate polyols, and combinations thereof. The polycarbonate polyol can be solid at room temperature or liquid at room temperature. The polycarbonate polyol can be derived from an organic carbonate and an aliphatic alcohol that includes at least two hydroxyl groups.

Suitable organic carbonates include, e.g., dialkyl carbonates, aromatic/aliphatic carbonates, and diaryl carbonates including, e.g., dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, didecyl carbonate, didodecyl carbonate, diphenyl carbonate, ethyl phenyl carbonate, dibenzyl carbonate, and combinations thereof.

Suitable dihydric alcohols include, e.g., ethylene glycol, diethylene glycol, triethylene glycol, 1,2- and 1,3-propanediol, 2-methyl-1,3-propanediol, dipropylene glycol, tripropylene glycol, neopentyl glycol, 1,2-, 1,3-, and 1,4-butanediol, 2-methyl-1,4-butanediol, 1,2-, 1,3-, and 1,5-pentanediol, 1,6-hexanediol, 1,8-octanediol, 2-methyl-1,8-octanediol, 1,9-nonanediol, 1,10-decanediol, 1,11-undecanediol, 1,12-dodecanediol, 1,13-tridecanediol, 1,14-tetradecanediol, 1,16-hexadecanediol, 1,18-octadecanediol, 1,12-octadecanediol, cyclopentanediol, cyclohexanediol, cyclohexanedimethanol, bis(4-hydroxycyclohexyl)methane, bis(4-hydroxycyclohexyl)ethane, 2,2-bis(4-hydroxycyclohexyl)propane, and combinations thereof.

Compositions

The polyurethanes (i.e., the isocyanate-terminated polyurethane prepolymers, the hydroxy-terminated polyurethanes, and the thermoplastic polyurethanes) have a variety of uses including, e.g., as additives, as one of, or the sole, component in a variety of compositions (e.g., coating compositions, polymer compositions, hot melt adhesive compositions, and hot melt moisture curable adhesive compositions), and combinations thereof.

Hot Melt Moisture Curable Adhesive Composition

Useful hot melt moisture curable adhesive compositions include the isocyanate-terminated polyurethane prepolymer either as the sole component of the moisture curable adhesive composition or optionally combined with additional components to form the hot melt moisture curable adhesive composition. Useful moisture curable hot melt adhesive compositions include 100% by weight, from at least 1% by weight to 99% by weight, or even from 10% by weight to 90% by weight of the isocyanate-terminated polyurethane prepolymer. The hot melt moisture curable adhesive composition optionally is formulated with additional components. The hot melt moisture curable adhesive composition can be formulated to exhibit any suitable viscosity including no greater than 100,000 centipoise (cP), no greater than 50,000 cP, no greater than 10,000 cP, no greater than 5,000 cP, or even no greater than 1000 cP at 120° C.

Catalyst

The hot melt moisture curable adhesive composition optionally includes a catalyst to increase the cure reaction rate. Useful catalysts include, e.g., ether and morpholine functional groups (e.g., 2,2'-dimorpholinoethylether, di(2,6-dimethyl morpholinoethyl) ether, and 4,4'-(oxydi-2,1-ethanediyl)bis-morpholine (DMDEE)), organometallic compounds based on metal (e.g., tin, iron, zinc, titanium, bismuth, potassium, cobalt, and manganese) and carboxylic acids, and combinations thereof.

The carboxylic acids used to form the organometallic catalysts can include any number of carbon atoms including, e.g., from 2 to 32 carbon atoms, and can be dicarboxylic acids. Useful acids include, e.g., adipic acid, maleic acid, fumaric acid, malonic acid, succinic acid, pimelic acid, terephthalic acid, phenylacetic acid, benzoic acid, acetic acid, propionic acid and also 2-ethylhexanoic acid, caprylic acid, capric acid, lauric acid, myristic acid, palmitic acid and stearic acid.

Specific examples of useful catalysts include dibutyltin diacetate, dibutyltin maleate, dibutyltin bis(2-ethylhexanoate), dibutyltin dilaurate, dioctyltin diacetate, dioctyltin maleate, dioctyltin bis(2-ethylhexanoate), dioctyltin dilaurate, tributyltin acetate, bis(β-methoxycarbonylethyl)tin dilaurate, bis(β-acetylethyl)tin dilaurate, and dialkyltin (IV) carboxylates. Suitable commercially available catalysts include, e.g., JEFFCAT DMDEE 4,4'-(oxydi-2,1-ethanediyl)bis-morpholine, which is available from Huntsman Corp. (Houston, Texas). When a catalyst is present, the hot melt moisture curable adhesive composition includes from about 0.005% by weight to about 3% by weight catalyst.

Additives

The hot melt moisture curable adhesive composition optionally includes a variety of additional components including, e.g., additional polymers (e.g., thermoplastic polymers (e.g., elastomeric thermoplastic polymers), antioxidants, stabilizers, tackifying agents, adhesion promoters, crosslinking agents, plasticizers, ultraviolet light stabilizers, rheology modifiers, corrosion inhibitors, colorants (e.g., pigments and dyes), fillers, nucleating agents, flame retardants, and combinations thereof.

Useful classes of optional thermoplastic polymers include, e.g., ethylene polar comonomer copolymers (e.g., ethylene vinyl acetate, ethylene alkyl (meth)acrylates (e.g., ethylene methyl acrylate, ethylene methyl methacrylate, ethylene ethyl acrylate, ethylene ethyl methacrylate, ethylene n-butyl acrylate, ethylene hydroxyethyl acrylate, and combinations thereof), ethylene vinyl acetate/vinyl alcohol copolymers, polyvinyl acetals, polyvinyl butyrals, ethylene vinyl butyrate copolymer, ethylene acrylic acid copolymer, ethylene methacrylic acid copolymer, ethylene acrylamide copolymer, ethylene methacrylamide copolymer, alkyl acrylates (e.g., ethyl acrylate, methyl acrylate, methyl methacrylate, 2-ethylhexyl acrylate, 2-ethylhexyl methacrylate, methoxyethyl methacrylate, methoxyethyl acrylate, and combinations thereof), ethylene n-butyl acrylate carbonmonoxide terpolymer, polyacrylonitriles, polyurethanes, polyesters, natural rubber and other polyisoprenes, polybutadienes, styrene-butadiene copolymers, block copolymers of styrene-butadiene-styrene, styrene-isoprene-styrene, styrene-ethylene-butylene-styrene, polystyrene, acrylonitrile-butadiene copolymers, acrylonitrile-butadiene-styrene copolymers, ethylene-propylene-diene terpolymers, polyolefins (e.g., polyolefin homopolymers (e.g., propylene, ethylene, and butylene), polyolefin copolymers (e.g., copolymers of propylene, ethylene, and butylene and at least one alpha-olefin co-monomer (e.g., alpha-olefin monomers having at least two carbon atoms, at least four carbon atoms, and combinations of such monomers including, e.g., ethylene, butene, pentene, hexene, heptene, octene, nonene, decene, dodecene, 4-methyl-pentene-1,3-methyl pentene-1,3,5,5-trimethyl-hexene-1,5-ethyl-1-nonene, 1,9-decadiene, and combinations thereof)) and combinations thereof), polyisobutylenes, polychloroprenes, polyvinyl chlorides, polyvinylidene chlorides, polytetrafluoroethylenes, polyhexafluoropropylenes, polychlorotrifluoroethylenes, polyvinylfluorides, polyvinylidene fluorides, polyamides, polyethyleneterephthalates, polyoxymethylenes, polycarbonates, polysulfides, polyphenylenesulfides, polysulfones, polyethersulfones, cellulosics, epoxies, phenolics, and combinations thereof.

The hot melt moisture curable adhesive composition optionally includes from 0% by weight to 99% by weight, from 5% by weigh to 75% by weight, or even from 20% by weight to 55% by weight thermoplastic polymer.

Useful antioxidants include, e.g., pentaerythritol tetrakis [3,(3,5-di-tert-butyl-4-hydroxyphenyl)propionate], 2,T-methylene bis(4-methyl-6-tert-butylphenol), phosphites including, e.g., tris-(p-nonylphenyl)-phosphite (TNPP) and bis(2,4-di-tert-butylphenyl)4,4'-diphenylene-diphosphonite, di-stearyl-3,3'-thiodipropionate (DSTDP), and combinations thereof. Useful antioxidants are commercially available under a variety of trade designations including, e.g., the IRGANOX series of trade designations including, e.g., IRGANOX 1010, IRGANOX 565, and IRGANOX 1076 hindered phenolic antioxidants, and IRGAFOS 168 phosphite antioxidant, all of which are available from BASF Corporation (Florham Park, New Jersey), and ETHYL 702 4,4'-methylene bis(2,6-di-tert-butylphenol), which is available from Albemarle Corporation (Baton Rouge, Louisiana). When present, the hot melt moisture curable adhesive composition includes from 0% by weight to 3% by weight, or even from 0.1% by weight to 2% by weight antioxidant.

Useful tackifying agents include, e.g., aromatic, aliphatic, and cycloaliphatic hydrocarbon resins, mixed aromatic and aliphatic modified resins, aromatic modified hydrocarbon resins, and hydrogenated versions thereof; terpenes, modified terpenes, and hydrogenated versions thereof; rosin esters (e.g., glycerol rosin ester, pentaerythritol rosin ester, and hydrogenated versions thereof); and combinations thereof. Useful aromatic resins include, e.g., aromatic modified hydrocarbon resins, alpha-methyl styrene resin, coumorone-indene resins, and styrenated terpene resin, polyphenols, polyterpenes, and combinations thereof. Useful aliphatic and cycloaliphatic petroleum hydrocarbon resins include, e.g., branched and unbranched C5 to C9 resins and the hydrogenated derivatives thereof. Useful polyterpene resins include copolymers and terpolymers of natural terpenes (e.g., styrene-terpene, alpha-methyl styrene-terpene, and vinyl toluene-terpene).

Useful optional fillers include, e.g., talcs, clays, and silicas and treated versions thereof, carbon blacks, micas, and combinations thereof. The optional filler can be present in the moisture curable adhesive composition in an amount of from 0% by weight to 60% by weight.

Useful optional adhesion promoters include silane-based adhesion promoters including, e.g., 3-glycidoxy propyl trimethoxy silane, octyltriethoxysilane, methyltrimethoxysilane, beta-(3,4-epoxy cyclohexyl)ethyl trimethoxy silane, methacryloxypropyl trimethoxy silane, alkyloxyiminosilanes, vinyl trimethoxy silane, vinyl triethoxy silane, vinyl methyl dimethoxy silane, and ethoxy and methoxy/ethoxy versions thereof, mercaptopropyl trimethoxysilane, and mixtures thereof. Suitable adhesion promoters are commercially available under a variety of trade designations including under the SILQUEST series trade designations from Momentive Performance Materials (Waterford, New York).

The moisture curable hot melt adhesive composition optionally includes a multifunctional crosslinking agent. Useful crosslinking agents include multifunctional compounds that have an average functionality of greater than two (e.g., greater than two functional groups, at least three functional groups, at least four functional groups, and mixtures thereof) including, e.g., greater than di-isocyanates, tri-isocyanates, tetra-isocyanates, and mixtures thereof. Suitable crosslinking agents are commercially available under a variety of trade designations including, e.g., the DESMODUR series of trade designations from COVESTRO LLC (Pittsburgh, Pennsylvania) including, e.g., DESMODUR N 3300 hexane diisocyanate (HDI) trimer, DESMODUR N 3200A HDI-biuret, DESMODUR ECO N 7300 pentamethylene diisocyanate (PDI) trimer, DESMODUR N 3400 HDI-uretdione, and DESMODUR Z2470 isophorone polyisocyanate. The moisture curable hot melt adhesive composition optionally includes from 0% by weight to 10% by weight or even from 0.1% by weight to 10% by weight crosslinking agent.

Articles

The hot melt moisture curable adhesive composition is useful in bonding substrates and articles used in a variety of industries including, e.g., automobile production, recreational vehicle production, aerospace, electronic assembly, appliance production, shoe manufacturing, woodworking (e.g., edge-banding and profile wrapping), bookbinding, film lamination, clothing production, disposable absorbent article, filter production, packaging production, and combinations thereof.

The polyurethanes and the hot melt moisture curable adhesive compositions can be used on a variety of substrates. Such substrates can be derived from a variety of components including, e.g., wood, cotton, wool, silk, leather, polyester, polyamide (e.g. Nylon-6 and Nylon-6,6), polyurethane, thermoplastic polyurethane, polyether-polyurea copolymer, polytetrafluoroethylene, other polymers (e.g., polycarbonate, polyolefin (e.g., polypropylene, polyethylene, low density polyethylene, linear low density polyethylene, high density polyethylene, polypropylene, and oriented polypropylene, copolymers of polyolefins and other comonomers), ethylene-vinyl acetate, ethylene-methacrylic acid ionomers, ethylene-vinyl-alcohols, polycarbonates, polyvinyl chloride, polyvinylidene chloride, cellulosics (e.g., Rayon, nitrocellulose, and cellulose acetate), polystyrene, and epoxy), elastomer (e.g., butyl rubber, styrene-butadiene-styrene, styrene-isoprene-styrene, styrene-ethylene/propylene-styrene and styrene-ethylene/butylene-styrene) polymer composites (e.g., composites of polymer and fiber, metal, cellulose, glass, polymer, and combinations thereof), metal (aluminum, copper, zinc, lead, gold, silver, platinum, and magnesium, and metal alloys such as steel, tin, brass, and magnesium and aluminum alloys), carbon-fiber composite, other fiber-based composite, graphene, fillers, glass (e.g., alkali-aluminosilicate toughened glass and borosilicate glass), quartz, boron nitride, gallium nitride, sapphire, silicon, carbide, ceramic and combinations thereof.

The substrates can be of a variety of forms including, e.g., woven, nonwoven, knitted, foams, membranes, fibers, threads, yarns, filaments, felts, sheets, films, foils (e.g., metal foil), textiles, and combinations thereof.

The substrates can have a variety of properties including, e.g., porous substrates (e.g., breathable and microporous substrates), flexible substrates (i.e., the substrate can be bent using no greater than the force of two hands), rigid substrates (i.e., the substrate cannot be bent by an individual using two hands or will break if an attempt is made to bend the substrate with two hands), polar substrates, nonpolar substrates, waterproof substrates, hydrophobic substrates, hydrophilic substrates, chemical resistant substrates, elastomeric substrates, conductive substrates, insulating substrates, transparent substrates, substrates that exhibit biocide properties, and combinations thereof.

The polyurethanes and the hot melt moisture curable adhesive compositions can be applied using any suitable application method including, e.g., manual or automatic fine line dispensing, slot die coating, roll coating, gravure coating, transfer coating, pattern coating, screen printing, spray coating, filament coating, by extrusion, air knife, trailing blade, brushing, dipping, doctor blade, offset gravure coating, rotogravure coating, and combinations thereof. The polyurethanes and the cured hot melt moisture curable adhesive composition can exist in a variety of forms including, e.g., in the form of continuous and discontinuous (e.g., pattern) coatings, beads, layers and films, and each form can include a single layer or multiple layers.

The surface of the substrate, on which the polyurethanes and the hot melt moisture curable adhesive composition are applied, optionally is treated to enhance adhesion using any suitable method for enhancing adhesion to the substrate surface including, e.g., corona treatments, chemical treatments, flame treatments, and combinations thereof.

The invention will now be described by way of the following examples. All parts, ratios, percentages, and amounts stated in the Examples are by weight unless otherwise specified.

EXAMPLES

Test Procedures

Test procedures used in the examples include the following. The procedures are conducted at room temperature (i.e., an ambient temperature of from about 20° C. to about 25° C.) unless otherwise specified.

Hydroxyl Number Test Method

Hydroxyl number is determined according to ASTM E-222-17 entitled, "Standard Test Methods for Hydroxyl Groups Using Acetic Anhydride Acetylation," with the exception that the acetylation reaction time is four hours.

Acid Number Test Method

Approximately 3 grams of sample is dissolved in a mixture of 50 mL of toluene and 50 mL isopropyl alcohol. Once the sample is dissolved, approximately 1 mL of a 1% solution of phenolphthalein in isopropyl alcohol is added to the solution and the solution is then titrated with a 0.1 N solution of potassium hydroxide in isopropyl alcohol. A blank is also titrated. The Acid Number of a sample is calculated according to the following formula:

$$\text{Acid Number} = [A \times N \times 56.1]/W,$$

where A is the volume in milliliters of the potassium hydroxide solution,

N is the normality of the potassium hydroxide solution, and

W is the sample weight in grams.

Differential Scanning Calorimetry (DSC) Test Method for Peak Melt Temperature (Tm), Heat of Fusion, Peak Crystallization Temperature, and Heat of Crystallization Peak crystallization temperature, peak melting temperature, heat of fusion and heat of crystallization are determined as follows: a 3 mg to 6 mg sample is placed into a pan specific to the machine being used (e.g., TA Q2000 DSC V24.11 with standard aluminum pans and lids). The sample is then covered with a specified lid and closed. A pan and lid containing no material are also closed and used as a reference sample. The sample is then loaded into the differential calorimeter and covered with a nitrogen blanket. The sample is equilibrated at 25° C., held at 25° C. for one minute, then heated at a rate of 10° C. per minute until the sample reaches 100° C. The sample is then put into an isothermal state for 1 minute at 100° C. The sample is then cooled at a rate of 10° C. per minute until the sample reaches a temperature of −25° C. Then the sample is again put into an isothermal state for 5 minutes at −25° C. The sample is then heated at 10° C. per minute until the sample reaches 100° C. The resulting data is represented in graphical exothermal down format containing Heat Flow versus Temperature. The Tm (melt temperature) is taken as the peak of the greatest magnitude during the second melt and is reported in degrees Celsius. The heat of fusion (Hfus) is taken during the second melt and is reported in units of Joules per gram (J/g). The peak crystallization temperature is taken during the cool down period and is reported in degrees Celsius. The heat of crystallization is taken during the cool down period and is reported in units of J/g.

Iodine Value Test Method

Iodine Value is determined according to AOCS Recommended Practice Cd 1c-85 (2017).

Viscosity Test Method

Viscosity is measured according to ASTM D286-15 using an AMETEK Brookfield viscometer equipped with a thermosel chamber and temperature control unit, a number 27 spindle, and a rotation speed (RPM) sufficient to achieve from 20% to 80% torque. The test sample is pre-melted at 120° C. and charged to the thermosel chamber in an amount sufficient to cover the spindle to the required level (typically approximately 10.5 g). The test sample and spindle are equilibrated in the thermosel at 120° C. for 10 minutes prior to testing at 120° C. unless otherwise noted.

Open Time Test Method

Open time is determined according to ASTM D4497-10 Standard Test Method for Determining the Open Time of Hot Melt Adhesives.

Green Strength Test Method

Green strength is determined as follows. A test sample is pre-melted at 120° C. Two 1 inch (in)×1 in×1 in oak wood blocks are prepared by screwing a 1⅛ in hook screw having a ½ in thread into the center of one face of each block. On one of the two blocks a 0.1 mL aliquot of molten test sample is applied to the center of the face of the block that is opposite the face on which the hook screw has been attached. The face of the other of the two blocks that is opposite the face into which the hook screw has been attached is quickly pressed into the applied test sample such that the hook screws are on opposite faces of the assembly. The blocks are held together for the specified period of time (referred to as the "set time"). After the period of time, the blocks are pulled apart from one another in tensile mode at the hook screws at a rate of 20 in per minute until break. The peak force required to break the bond is measured and recorded as the green strength in units of pounds per square inch (psi).

% NCO Test Method

The percent isocyanate (% NCO) is determined according to ASTM D2572 entitled, "Standard Test Method for Isocyanate Groups in Urethane Materials or Prepolymers."

Semi-Crystalline Polyester Polyol 1

NATUREWAX S-155 hydrogenated soybean oil, in an amount of 848.2 g, having an Iodine Value of 0.5 (Cargill Inc., Charlotte, North Carolina) was melted in a glass reactor by heating to 105° C. Pentaerythritol, in an amount of 117.9 g, and 96 mg of lithium hydroxide monohydrate were then added to the reactor with stirring. The mixture was heated to 225° C. under a nitrogen atmosphere. The mixture was held at 225° C. for 5.5 hours and then cooled to 85° C., at which point the stirring was discontinued. The mixture was allowed to solidify and cool to room temperature overnight. The mixture was then heated to 100° C., at which point stirring was started. Adipic acid, in an amount of 201.1 g, and 86 mg tetraisopropyltitanate were then added to the mixture. The mixture was heated in stages under a nitrogen atmosphere to 240° C., held at 240° C. for 7 hours, cooled to 120° C., and then discharged from the reactor.

The resulting polyester polyol was tested according to the Hydroxyl Number, Acid Number, Heat of Fusion, Peak Melting Temperature, Peak Crystallization Temperature, and Heat of Crystallization test methods and found to have a hydroxyl number of 34.1, an acid number of 0.58, a heat of fusion of 89.2 J/g, a peak melting temperature of 42.9° C., a peak crystallization temperature of 38.8° C., and a heat of crystallization of 90.7 J/g.

Semi-Crystalline Polyester Polyol 2

An amount of 606.3 g of NATUREWAX S-155 hydrogenated soybean oil (0.686 mol) having an Iodine Value of 0.5 and 93.52 g (0.686 mol) of pentaerythritol were charged to a 2 L glass reactor equipped with a distillation apparatus and the atmosphere in the reactor was replaced with nitrogen. The temperature was set to 215° C. and stirring was started. When the mixture was molten, 179 mg of lithium hydroxide monohydrate catalyst was added thereto with stirring. The mixture was held at 215° C. for 5 hours while stirring continued.

Then 123.81 g (0.836 mol) of phthalic anhydride were added to the reactor along with 16.4 g of o-xylene as an azeotrope. Mixture was held at from 120° C. to 230° C. for 15 hours with stirring. The resulting polyester polyol was removed from the reactor at 100° C.

The polyester polyol was tested according to the Acid Number, Hydroxyl Number, Heat of Fusion, Peak Melting Temperature, Peak Crystallization Temperature, and Heat of Crystallization test methods and found to have an acid number of 1.57, hydroxyl number of 65, a heat of fusion of 85.4 J/g, a peak melting temperature of 45.4° C., a heat of crystallization of 84.4 J/g, and a peak crystallization temperature of 41.1° C.

Semi-Crystalline Polyester Polyol 3

An amount of 606.3 g of hydrogenated soybean oil (0.686 mol) having an Iodine Value of 0.5 and 93.52 g (0.686 mol) of pentaerythritol were charged to a 2 L glass reactor equipped with a distillation apparatus and the atmosphere in the reactor was replaced with nitrogen. The temperature was set to 215° C. and stirring was started. When the mixture was molten, 175 mg of lithium hydroxide monohydrate catalyst was added thereto with stirring. The mixture was held at 215° C. for 5 hours while stirring continued.

Then 123.8 g (1.194 mol) of phthalic anhydride were added to the reactor along with 16.4 g of o-xylene as an azeotrope. Mixture was held at a temperature of from 120° C. to 230° C. for 15 hours while stirring continued.

Then, the resulting polyester polyol was taken out at 100° C. The polyester polyol was tested according to the Acid Number, Hydroxyl Number, Heat of Fusion, and Peak Melting Temperature, Peak Crystallization Temperature, and Heat of Crystallization of test methods and found to have an acid number of 0.57, hydroxyl number of 35.4, a heat of fusion of 73.5 J/g, a peak melting temperature of 41.8° C., a heat of crystallization of 76.7 J/g, and a peak crystallization temperature of 36.8° C.

Semi-Crystalline Polyester Polyol 4

An amount of 606.3 g of hydrogenated soybean oil (0.686 mol) having an Iodine Value of 0.5 and 93.52 g (0.686 mol)

of pentaerythritol were charged to a 2 L glass reactor equipped with a distillation apparatus and the atmosphere in the reactor was replaced with nitrogen. The temperature was set to 215° C. and stirring was started. When the mixture was molten, 175 mg of lithium hydroxide monohydrate catalyst was added thereto with stirring at 215° C. for 5 hours.

Then 238.51 g (1.036 mol) of dodecanedioic acid and 16.4 g of o-xylene as an azeotrope. The mixture was held at from 120° C. to 230° C. for 15 hours while stirring continued. The resulting polyester polyol was taken out of the reactor at 100° C.

The polyester polyol was tested according to the Acid Number test method and found to have an acid number of 0.80.

Semi-Crystalline Polyester Polyol 5

An amount of 606.3 g of hydrogenated soybean oil (0.686 mol) having an Iodine Value of 0.5 and 93.52 g (0.686 mol) of pentaerythritol were charged to a 2 L glass reactor equipped with a distillation apparatus and the atmosphere in the reactor was replaced with nitrogen. The temperature was set to 215° C. and stirring was started. When the mixture was molten, 175 mg of lithium hydroxide monohydrate catalyst was added thereto with stirring. The mixture was held at 215° C. for 5 hours while stirring continued.

Then 122.58 g (1.038 mol) of succinic acid and 16.4 g of o-xylene as an azeotrope. Mixture was stirred from 120° C. to 230° C. for 15 hours. The resulting polyester polyol was removed from the reactor at 100° C.

The polyester polyol was tested according to the Acid Number test method and found to have an acid number of 0.77.

Semi-Crystalline Polyester Polyol 6

An amount of 545.25 g of hydrogenated soybean oil (0.617 mol) having an Iodine Value of 0.5 and 154.58 g (0.617 mol) of bis(trimethylolpropane) were charged to a 2 L glass reactor equipped with a distillation apparatus and the atmosphere in the reactor was replaced with nitrogen. The temperature was set to 215° C. and stirring was started. When the mixture was molten, 4.19 g of FASCAT 4102 monobutyltin tris-2-ethylhexanoate catalyst (PMC Organometalix Inc., Mount Laurel, New Jersey) was added thereto with stirring. The mixture was held at 215° C. while stirring continued for 5 hours.

Then 151.4 g (1.036 mol) of adipic acid and 16.4 g of o-xylene as an azeotrope. The mixture was stirred from 120° C. to 230° C. for 15 hours. The resulting polyester polyol was removed from the reactor at 100° C.

The polyester polyol was tested according to the Acid Number, Heat of Fusion, Peak Melting Temperature, Peak Crystallization Temperature, and Heat of Crystallization test methods and found to have an acid number of 0.28, a heat of fusion of 82.6 J/g, a peak melting temperature of 35.5° C., a heat of crystallization of 84.7 J/g, and a peak crystallization temperature of 33.8° C.

Semi-Crystalline Polyester Polyol 7

An amount of 611.74 g of hydrogenated soybean oil (0.693 mol) having an Iodine Value of 0.5 and 88.08 g (0.346 mol) of di-pentaerythritol were charged to a 2 L glass reactor equipped with a distillation apparatus and the atmosphere in the reactor was replaced with nitrogen. The temperature was set to 215° C. and stirring was started. When the mixture was molten, 3.28 g of FASCAT 4102 catalyst was added thereto with stirring. The mixture was held at 215° C. with continuous stirring for 5 hours.

Then 105.28 g (0.892 mol) of succinic acid and 16.4 g of o-xylene as an azeotrope. The mixture was stirred for from 120° C. to 230° C. for 15 hours. Then, the resulting polyester polyol was taken out at 100° C.

The polyester polyol was tested according to the Acid Number, Heat of Fusion, Peak Melting Temperature, Peak Crystallization Temperature, and Heat of Crystallization test methods and found to have an acid number of 1.3, a heat of fusion of 92.0 J/g, a peak melting temperature of 45.7° C., a heat of crystallization of 89.3 J/g, and a peak crystallization temperature of 39.6° C.

Semi-Crystalline Polyester Polyol 8

NATUREWAX S-155 hydrogenated soybean oil, in an amount of 837.1 g, having an Iodine Value of 0.48 (Cargill Inc., Charlotte, North Carolina) was melted in a glass reactor by heating to 105° C. Pentaerythritol, in an amount of 129.1 g, and 97 mg of lithium hydroxide monohydrate were then added to the reactor with stirring. The mixture was heated to 220° C. and under a nitrogen atmosphere. The mixture was held at 220° C. for 2 hours and then cooled to 93° C., at which point the stirring was discontinued. The mixture was allowed to solidify and cool to room temperature overnight. The mixture was then heated to 130° C., at which point stirring was started. Adipic acid, in an amount of 185.4 g, and 58 mg, tetra-n-butyl titanate were then added to the mixture. The mixture was heated in stages under a nitrogen atmosphere to 220° C., held at 220° C. for 7 hours, and then cooled to 117° C. and discharged from the reactor.

The resulting polyester polyol was tested according to the Hydroxyl Number, Acid Number, Heat of Fusion, Peak Melting Temperature, Peak Crystallization Temperature, and Heat of Crystallization test methods and found to have a hydroxyl number of 56.4, an acid number of 0.60, a heat of fusion of 95.3 J/g, a peak melting temperature of 43.4° C., a peak crystallization temperature of 40.1° C., and a heat of crystallization of 97.7 J/g.

Semi-Crystalline Polyester Polyol 9

NATUREWAX S-155 hydrogenated soybean oil, in an amount of 779.7 g, having an Iodine Value of 0.48 (Cargill Inc., Charlotte, North Carolina) was melted in a glass reactor by heating to 120° C. Pentaerythritol, in an amount of 120.2 g, and 1.10 g of FASCAT 4102 monobutyltin tris-2-ethylhexanoate (PMC Organometalix Inc., Mount Laurel, New Jersey) were then added to the reactor with stirring. The mixture was heated to 210° C. and under a nitrogen atmosphere. The mixture was held at 210° C. for 3 hours and then cooled to 99° C., at which point the stirring was discontinued. The mixture was allowed to solidify and cool to room temperature overnight. The mixture was then heated to 122° C., at which point stirring was started. Adipic acid, in an amount of 217.4 g was then added to the mixture. The mixture was heated in stages under a nitrogen atmosphere to 210° C., held at 230° C. for 3 hours and then heated to, and held at, 240° C. for 1.5 hours. The mixture was cooled to 130° C. and then discharged from the reactor.

The resulting polyester polyol was tested according to the Hydroxyl Number, Acid Number, Heat of Fusion, Peak Melting Temperature, Peak Crystallization Temperature, and Heat of Crystallization test methods and found to have a hydroxyl number of 28.3, an acid number of 0.49, a heat of fusion of 88.3 J/g, a peak melting temperature of 41.7° C., a peak crystallization temperature of 38.3° C., and a heat of crystallization of 86.4 J/g.

Semi-Crystalline Polyester Polyol 10

NATUREWAX S-155 hydrogenated soybean oil, in an amount of 848.42 g, having an Iodine Value of 0.48 (Cargill Inc., Charlotte, North Carolina) was melted in a glass reactor by heating to 120° C. Pentaerythritol, in an amount of 117.81 g, and 0.1 g of lithium hydroxide monohydrate (Sigma Aldrich, Saint Louis, Missouri) were then added to the reactor with stirring. The mixture was heated to 230° C. under a nitrogen atmosphere. The mixture was held at 230° C. for 6 hours and then cooled to 99° C., at which point the stirring was discontinued. The mixture was allowed to solidify and cool to room temperature overnight. The mixture was then heated to 140° C., at which point stirring was started and an additional 0.1 g of lithium hydroxide monohydrate was added. The mixture was then heated to 230° C. and stirred under a nitrogen environment for 5 hours. The mixture was then cooled to 95° C. before stopping mixing and allowing the mixture to solidify overnight. The mixture was then heated to 110° C. before resuming stirring. Adipic acid, in an amount of 202.08 g, and 0.0881 g of TYZOR TPT triisopropyltitanate (Dorf Ketal, Gujarat, India) were then added to the mixture. The mixture was heated to 210° C. under a nitrogen atmosphere and further heated in stages to 240° C. over 3.5 hours. The mixture was held at 240° C. for 3.5 hours, and subsequently held at 240° C. for 8 hours and 5 hours with cooling to solidification overnight between these additional heating stages. The mixture was then allowed to cool to 94° C. and discharged from the reactor.

The resulting polyester polyol was tested according to the Hydroxyl Number, Acid Number, Heat of Fusion, Peak Melting Temperature, and Peak Crystallization Temperature test methods and found to have a hydroxyl number of 28.4, an acid number of 0.67, a heat of fusion of 89.94 J/g, a peak melting temperature of 38.92° C., and a peak crystallization temperature of 38.87° C.

Example 1

A polyurethane prepolymer was prepared by first neutralizing 260 g of Semi-Crystalline Polyester Polyol 10 with 0.0625 g of 85% phosphoric acid in water. A 41.88 g sample of the resulting neutralized polyester polyol was heated to 120° C. and thoroughly mixed with 8.12 g of ISONATE 125M pure methylene diphenyl diisocyanate (MDI) (The Dow Chemical Company, Midland, Michigan). A portion of this mixture was transferred to a THERMOSEL sample chamber and placed in a THERMOSEL (AMETEK Brookfield, Middleborough, Massachusetts) maintained at 120° C. The mixture was reacted under these conditions for 7 hours before removal and evaluation of % NCO and DSC. The viscosity of the mixture was monitored and recorded in-situ via Brookfield viscometer (spindle 27, 10 RPM) over the course of the 7-hour reaction. The viscosity at the end of the 7-hour reaction time was 145 cP at 120° C., the NCO content was 3.64%, the heat of fusion was 62.75 J/g, and the peak melt temperature was 32.72° C.

Example 2

A polyurethane prepolymer was prepared by first neutralizing 260 g of Semi-Crystalline Polyester Polyol 10 with 0.0625 g of 85% phosphoric acid in water. A 11.69 g sample of the resulting neutralized polyester polyol was combined with 23.23 g of PIOTHANE 5500 EHNA polyester diol derived from 1,2 ethylene diol, 1,6-hexane diol, 2,2-dimethyl-1,3-propandiol and adipic acid (Panolam Industries, Shelton, Connecticut) and the resulting blend was heated to 120° C. ISONATE 125M pure MDI, in an amount of 5.32 g, was then added to the polyester polyol blend and thoroughly mixed. A portion of the mixture was transferred to a THERMOSEL sample chamber and placed in a THERMOSEL (AMETEK Brookfield, Middleborough, Massachusetts) maintained at 120° C. The mixture was then reacted under these conditions for seven hours before removal and evaluation of % NCO and DSC. The viscosity of the mixture was monitored and recorded in-situ via Brookfield viscometer (spindle 27, 10 RPM) over the course of the 7-hour reaction. The viscosity at the end of the 7-hour reaction was 3025 cP at 120° C., the NCO content was 3.23%, the heat of fusion was 29.8 J/g, and the peak melt temperature of 32.4° C.

Example 3

Semi-Crystalline Polyester Polyol 10 in an amount of 437.38 g, 0.175 g of 85% phosphoric acid (aqueous), 0.05 g of BENETEX OB 2,2'-(2,5-thiophenediyl)bis(5-tert-butylbenzoxazole) (Mayzo, Suwanee, Georgia), and 0.5 g of DOWSIL 163 silicone antifoam agent (The Dow Chemical Company, Midland Michigan) were combined in a one liter glass reactor and heated to 104° C. After drying for 1 hour under vacuum, the vacuum was broken with nitrogen, and 61.9 g of ISONATE 125M pure MDI (The Dow Chemical Company, Midland, Michigan) was added. The mixture was allowed to react under vacuum for 1 hour at 116° C. The resulting reaction product exhibited an NCO content of 2.45%, a viscosity of 520 cP at 93° C. and 50 rotations per minute, an open time of less than 10 seconds, and a green strength of 78.4 psi after a 15 second set time, 86.3 psi after a 30 second set time, and 88.9 psi after a 1 min set time.

Example 4

PIOTHANE 5500 EHNA in an amount of 286 g, 143.85 g of semi-crystalline polyester polyol 10, 0.1 g of 85% phosphoric acid (aqueous), 0.25 g of BENETEX OB 2,2'-(2,5-thiophenediyl)bis(5-tert-butylbenzoxazole) (Mayzo, Suwanee, Georgia), and 0.5 g of DOWSIL 163 silicone antifoam agent (The Dow Chemical Company, Midland Michigan) were combined in a one liter glass reactor and heated to 104° C. After drying for 1 hour under vacuum, vacuum was broken with nitrogen and 69.5 g of ISONATE 125M pure MDI (The Dow Chemical Company, Midland, Michigan) was added. The mixture was allowed to react under vacuum for 1 hour at 116° C. The resulting reaction product exhibited an NCO content of 3.15%, a viscosity of 2,400 cP at 121° C. and 20 rotations per minute, an open time of 10 seconds, and a green strength of 39.2 psi after a 1 min set time, 37.7 psi after a 2 min set time, and 35.4 psi after a 3 min set time.

Example 5

ESCORENE UL05540 ethylene vinyl acetate copolymer (ExxonMobil Chemical Company, Spring, Texas) in an amount of 83.9 g, 38.15 g of ATEVA 2810 ethylene vinyl acetate copolymer (Celanese Corporation, Dallas, Texas), and 192.6 g of UNILENE B-110 C9 thermoplastic hydrocarbon resin (Braskem SA, Philadelphia, Pennsylvania) were combined and heated to a temperature of 182° C. in a one liter glass reactor. Once molten, 0.195 g of 85% phosphoric acid (aqueous) was added and mixing was started. PRIPLAST 3187 dimerized fatty acid polyester polyol (Croda International, PLC, Plainsboro, New Jersey) in an amount of 96.65 g, and 50.85 g of Semi-Crystalline Polyester Polyol 10 were charged to the reactor and the temperature of the mixture was reduced to 121° C. The resulting mixture was stirred under vacuum for 60 minutes. Vacuum was then broken with nitrogen and 37.15 g of ISONATE 125M was charged. The mixture was then allowed to react under vacuum for 60 minutes. JEFFCAT DMDEE 4,4'-

(oxydi-2,1-ethanediyl)bis-morpholine (Huntsman Corp., Houston, Texas) in an amount of 0.5 g was then added to the mixture and mixing was continued under vacuum for 15 minutes before discharge. The resulting hot melt moisture curable adhesive exhibited an NCO content of 1.7%, a viscosity of 5600 cP, an open time of 1.5 minutes, and green strength of 52 psi after a 1 min set time, 61.8 psi after a 2 min set time, and 60.7 psi after a 3 min set time.

Other embodiments are within the claims.

What is claimed is:

1. A polyurethane prepolymer comprising the reaction product of
   diisocyanate, and
   a semi-crystalline polyester polyol having an acid number of less than 4 and being solid at room temperature, the semi-crystalline polyester polyol comprising the reaction product of
      a saturated fatty component having a hydroxyl number less than 2 mg KOH/g, the saturated fatty component being selected from the group consisting of saturated fatty acid, saturated fatty acid ester, saturated oil, and combinations thereof,
      a polyhydric alcohol comprising at least three hydroxyl groups, and
      a dibasic acid,
   the polyurethane prepolymer being isocyanate-terminated.

2. The polyurethane prepolymer of claim 1 comprising the reaction product of
   the diisocyanate,
   the semi-crystalline polyester polyol, and
   a second polyol.

3. The polyurethane prepolymer of claim 2, wherein the second polyol is selected from the group consisting of polyether polyol, polyester polyol, polycarbonate polyol, polybutadiene polyol, polyacetal, and combinations thereof.

4. The polyurethane prepolymer of claim 2, wherein the second polyol comprises polybutadiene polyol.

5. The polyurethane prepolymer of claim 1 comprising the reaction product of
   the diisocyanate,
   the semi-crystalline polyester polyol,
   a second polyol, and
   a multifunctional crosslinking agent comprising at least three reactive groups.

6. The polyurethane prepolymer of claim 1, wherein the semi-crystalline polyester polyol has an average hydroxyl functionality of from to 1.5 to 2.5.

7. The polyurethane prepolymer of claim 1, wherein the semi-crystalline polyester polyol exhibits a peak crystallization temperature of at least 30° C.

8. The polyurethane prepolymer of claim 1, wherein the semi-crystalline polyester polyol has a hydroxyl number of from 10 mg KOH/g to 110 mg KOH/g.

9. The polyurethane prepolymer of claim 1, wherein the semi-crystalline polyester polyol has an acid number of no greater than 2.

10. The polyurethane prepolymer of claim 1, wherein the polyhydric alcohol is a tetraol.

11. The polyurethane prepolymer of claim 1, wherein the fatty component has an Iodine Value no greater than 50 grams of Iodine per 100 grams of fatty component (gI/100g).

12. The polyurethane prepolymer of claim 1, wherein the semi-crystalline polyester polyol is further derived from monomeric diol.

13. The polyurethane prepolymer of claim 1, wherein the semi-crystalline polyester polyol has a hydroxyl number of from 10 mg KOH/g to 110 mg KOH/g and an acid number no greater than 2.

14. A hot melt moisture curable adhesive composition comprising the polyurethane prepolymer of claim 1.

15. The hot melt moisture curable adhesive composition of claim 14 further comprising a thermoplastic polymer.

16. An article comprising:
    a substrate; and
    the cured hot melt moisture curable adhesive composition of claim 14 disposed on the substrate.

17. The polyurethane prepolymer of claim 1, wherein the saturated fatty component is a saturated fatty acid ester, a saturated oil, or a combination thereof, and the reaction product includes a transesterification product resulting from the transesterification of the saturated fatty component with the polyhydric alcohol.

18. The polyurethane prepolymer of claim 17, wherein the semi-crystalline polyester polyol has a hydroxyl number of from 10 mg KOH/g to 110 mg KOH/g.

19. A hot melt moisture curable adhesive composition comprising the polyurethane prepolymer of claim 18.

20. The hot melt moisture curable adhesive composition of claim 19 further comprising a thermoplastic polymer.

21. A hot melt moisture curable adhesive composition comprising:
    a polyurethane prepolymer comprising the reaction product of diisocyanate, and
    a semi-crystalline polyester polyol having an acid number of less than 4 and being solid at room temperature, the semi-crystalline polyester polyol comprising the reaction product of
       a saturated fatty component having a hydroxyl number less than 2 mg KOH/g, the saturated fatty component being selected from the group consisting of saturated fatty acid, saturated fatty acid ester, saturated oil, and combinations thereof,
       a polyhydric alcohol comprising at least three hydroxyl groups, and
       a dibasic acid.

22. The hot melt moisture curable adhesive composition of claim 21, wherein the polyurethane prepolymer comprises a hydroxy-terminated polyurethane prepolymer having a ratio of isocyanate groups to hydroxyl groups of less than 1.

23. An article comprising:
    a substrate; and
    a thermoplastic polyurethane comprising the polyurethane prepolymer of claim 22 disposed on the substrate.

24. The hot melt moisture curable adhesive composition of claim 21, wherein the semi-crystalline polyester polyol has a hydroxyl number of from 10 mg KOH/g to 110 mg KOH/g.

* * * * *